US008582459B2

(12) United States Patent
Hasegawa et al.

(10) Patent No.: US 8,582,459 B2
(45) Date of Patent: Nov. 12, 2013

(54) COMMUNICATION APPARATUS AT SUBSCRIBER HOME

(75) Inventors: Kazutomo Hasegawa, Kanagawa (JP); Tetsuya Yokomoto, Kanagawa (JP); Dai Suzuki, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 401 days.

(21) Appl. No.: 12/921,779

(22) PCT Filed: Feb. 18, 2009

(86) PCT No.: PCT/JP2009/000655
§ 371 (c)(1),
(2), (4) Date: Oct. 13, 2010

(87) PCT Pub. No.: WO2010/023775
PCT Pub. Date: Mar. 4, 2010

(65) Prior Publication Data
US 2011/0020000 A1    Jan. 27, 2011

(30) Foreign Application Priority Data

Aug. 27, 2008  (JP) .................... 2008-217625

(51) Int. Cl.
*G01R 31/08* (2006.01)
(52) U.S. Cl.
USPC ........................................................ 370/252
(58) Field of Classification Search
USPC ................................ 370/241, 241.1, 252, 254–5
See application file for complete search history.

(56) References Cited

U.S. PATENT DOCUMENTS 7,630,639 B2 * 12/2009 Kramer et al. ................. 398/72
2006/0153222 A1 * 7/2006 Van Caenegem et al. .... 370/445

FOREIGN PATENT DOCUMENTS

| JP | 2003-332991 A | 11/2003 |
| JP | 2007-243796 | 9/2007 |
| WO | 2007/077923 A1 | 7/2007 |
| WO | 2009/057392 A1 | 5/2009 |

OTHER PUBLICATIONS

Office Action issued for corresponding Chinese Patent App. No. 200980123525.1 on Nov. 2, 2012, and its English translation.

* cited by examiner

*Primary Examiner* — Mark Rinehart
*Assistant Examiner* — Peter Cheng
(74) *Attorney, Agent, or Firm* — Ladas & Parry, LLP

(57) ABSTRACT

An MC-ONU is an ONU installed at a subscriber's home. The MC-ONU includes: a receiving unit which receives signals transmitted from an OLT at a telecommunications carrier site which has not established a link; a determining unit which determines the OLT, which has not established a link, to be a remote-end device in point-to-point communication on the condition that the signal received for a predetermined period of time is idle signal only; and a transmitting unit which starts transmitting signals to the OLT from the subscriber's home on the condition that it has been determined by the determining unit that the OLT is the remote-end device in point-to-point communication.

12 Claims, 4 Drawing Sheets

Fig. 4
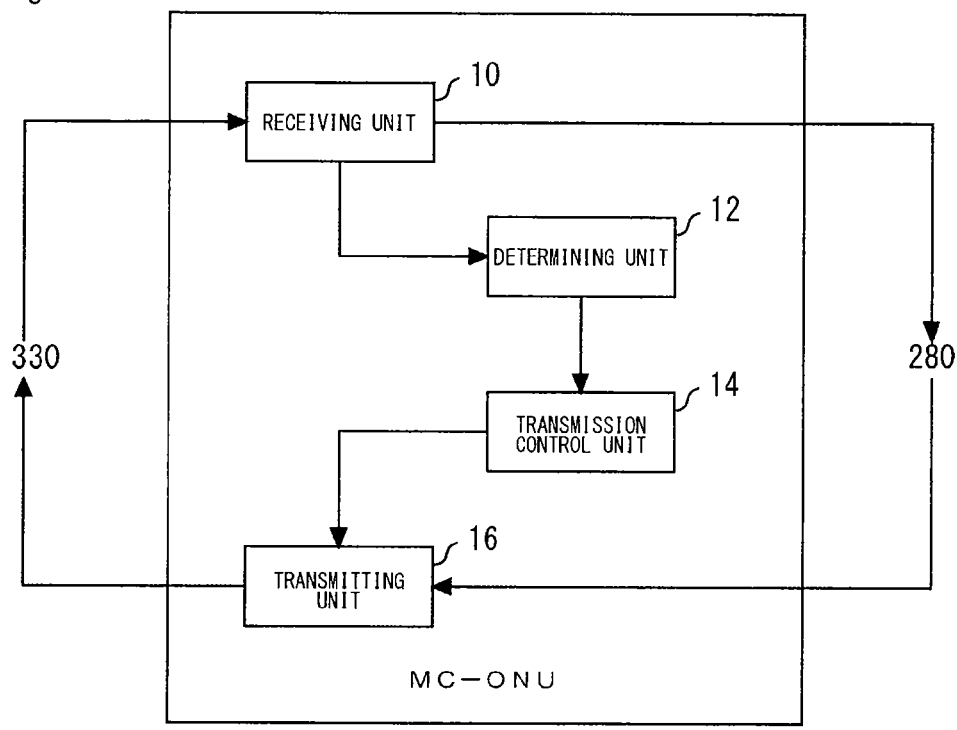
Fig. 5(a)
| CODE | CODE GROUP | OCTET VALUE |
|---|---|---|
| /I1/ | /K28.5/D5.6/ | BCC5 |
| /I2/ | /K28.5/D16.2/ | BC50 |
Fig. 5(b)
| CODE | CODE GROUP | OCTET VALUE |
|---|---|---|
| /C1/ | /K28.5/D21.5/D0.0/D0.0/ | BCB50000 |
| /C2/ | /K28.5/D2.2/D0.0/D0.0/ | BC420000 |
Fig. 6]
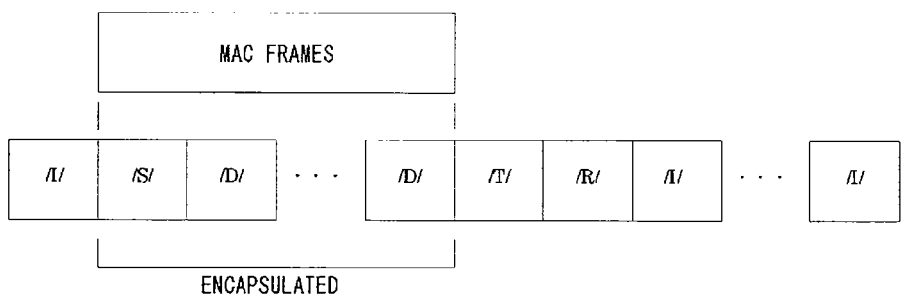

Fig. 7(a)

| |
|---|
| Destination Address (6 Octets FIXED VALUE : 01-80-C2-00-00-01) |
| Source Address (6 Octets VARIABLE VALUE) |
| Type (2 Octets FIXED VALUE : 88-08) |
| Opcode (2 Octets FIXED VALUE : 00-02 (PAUSE FRAME IS 00-01)) |
| Timestamp (4 Octets VARIABLE VALUE) |
| Number of grants/Flags (1 Octets PARTIALLY FIXED VALUE) |
| Data/Reserved/Pad (39 Octets VARIABLE VALUE) |
| FCS (4 Octets VARIABLE VALUE) |

Fig. 7(b)

| BIT | FIELD / VALUE |
|---|---|
| 0 - 2 | Number of grants / VARIABLE VALUE |
| 3 | Discovery / FIXED VALUE (1) |
| 4 - 7 | Force Report / VARIABLE VALUE |

COMMUNICATION APPARATUS AT SUBSCRIBER HOME

CROSS-REFERENCE TO RELATED APPLICATIONS:

This application is the U.S. National Stage of International Patent Application No. PCT/JP2009/000655 filed on Feb. 18, 2009, which claims priority to Japanese Patent Application No. 2008-217625 filed on Aug. 27, 2008, the disclosures of which is hereby incorporated by reference in its entirety.

TECHNICAL FIELD

The present invention relates to a data communication technology. In particular, the invention relates to a communication apparatus at a subscriber home which is in point-to-point communication with a communication apparatus at a telecommunications carrier site.

BACKGROUND ART

A single star (SS) type network system 110 as shown in FIG. 1(a) is a type of optical access network in which optical fiber is used for data transmission in the access line domain. In the SS type network system 110, communications between an optical line terminal (OLT) 111 and an optical network unit (ONU) 115 take up the whole bandwidth of optical fiber 112.

Another mode of optical access network is a passive optical network (PON) type network system 120 as shown in FIG. 1(b). In the PON type network system 120, the bandwidth of optical fiber 140 between an OLT 130 located at a telephone station or the like and an optical splitter 150, which is a branch point for optical fibers to optical network units (ONUs) 170 located at a plurality of subscriber homes is shared by the ONUs 170.

A media converter is a typical equipment used to transmit data in a point-to-point (hereinafter also referred to as "P2P" as appropriate) transmission scheme in the SS type network system 110.

Recently, a transmission scheme using Ethernet (registered trademark) standardized by the IEEE 802 Committee, called "EFM" (Ethernet (registered trademark) in the First Mile), has been finding use in the access line domain. An example of an EFM transmission scheme established by IEEE is "1000BASE-BX10", which is a P2P transmission scheme capable of realizing a transmission speed of 1 Gbps.

Also, there are "1000BASE-PX10" and long-distance version "1000BASE-PX20" as point-to-multipoint transmission schemes in the PON type network system 120 capable of realizing the transmission speed of 1 Gbps. The "1000BASE-PX10" and "1000BASE-PX20" are commonly known as "EPON", or "Ethernet (registered trademark) Passive Optical Network".

[Patent Citation 1] Japanese Patent Application Publication No. 2003-332991

DISCLOSURE OF INVENTION

Technical Problem

FIG. 2 shows a configuration of an EPON system 220. FIG. 2 represents a state in which a media converter subscriber home unit MC-ONU 270 is mistakenly connected to an optical fiber 260 which is branched from a shared optical fiber 240 at an optical splitter 250. Under normal circumstances, the MC-ONU 270 is an optical network unit (ONU) which is connected to the optical fiber the other end of which being terminated by a media converter telephone station unit MC-OLT (not shown) in an SS type network system 110 and which performs P2P communication with the MC-OLT.

The MC-ONU 270 transmits signals primarily for P2P communication. Thus, in a state as shown in FIG. 2, the signals transmitted from the MC-ONU 270 collide with the signals from an EPON-ONU 271 connected to the EPON system 220, which results in an unwanted effect on data transmission by the EPON-ONU 271. And the inventors have come to consider it desirable that the MC-ONU be provided with a function of avoiding its adverse effects on the other transmission lines by its mistaken connection to the EPON system 220.

Proposed in the above-mentioned Patent Document 1 is a procedure by which an OLT inserts a maintenance frame containing interface version information, indicating connecting conditions of an EPON to an OLT, into an idle signal and then an ONU having received the signal transmits signals after the ONU has decided that a remote-end device (communicating party) to the ONU itself is the EPON-OLT. This method, however, requires the insertion of the maintenance frame into the idle signal, which precludes the direct use of the EFM transmission scheme established by the IEEE. As a result, there may be cases where the system loses its general-purpose usability and compatibility.

The present invention has been made in view of these problems to be solved, and a main objective thereof is to provide a technology to realize an ONU capable of avoiding its adverse effects on the other transmission lines even when it is mistakenly connected to a primarily incompatible system, while complying with the EFM transmission scheme established by the IEEE.

Technical Solution

In order to resolve the above-described problems to be solved, a subscriber-home communication apparatus according to one embodiment of the present invention is a communication apparatus installed at a subscriber home and the communication apparatus comprises: a receiving unit which receives a signal transmitted from a communication apparatus installed at a telecommunications carrier site which has not established a link; a determining unit which determines that the communication apparatus which has not established a link is a remote-end device in point-to-point communication on the condition that the signal received by the receiving unit for a predetermined period of time is idle signal only; and a transmitting unit which starts transmitting a signal to the communication apparatus, which has not established a link, from the subscriber home on the condition that it has been determined by the determining unit that the communication apparatus which has not established a link is the remote-end device in point-to-point communication.

Advantageous Effects

According to the present invention, even when an ONU for point-to-point communication is mistakenly connected to an EPON system, its adverse effects on the other transmission lines in the EPON system can be avoided.

BRIEF DESCRIPTION OF DRAWINGS

FIG. 1(a) illustrates an SS type network system.

FIG. 1(b) illustrates a PON type network system.
FIG. 2 shows a configuration of an EPON system.
FIG. 3 shows a configuration of an optical communication system according to an embodiment of the present invention.
[FIG. 4]
FIG. 4 is a block diagram showing a functional configuration of an MC-ONU shown in FIG. 3.
[FIG. 5(a)]
FIG. 5(a) shows identification information concerning an Idle signal.
[FIG. 5(b)]
FIG. 5(b) shows identification information concerning an Auto-negotiation signal.
[FIG. 6]
FIG. 6 shows a state of a MAC frame encapsulated for transmission.
[FIG. 7(a)]
FIG. 7(a) shows a constitution of a Discovery GATE signal of an EPON.
[FIG. 7(b)]
FIG. 7(b) shows a constitution of a Number of grants/Flags field.

EXPLANATION OF REFERENCE

10 Receiving unit, 12 Determining unit, 14 Transmission control unit, 16 Transmitting unit, 110 SS type network system, 112 Optical fiber, 120 PON type network system, 130 OLT, 140 Optical fiber, 150 Optical splitter, 220 EPON system, 240 Optical fiber, 250 Optical splitter, 260 Optical fiber, 270 MC-ONU, 271 EPON-ONU, 280 Subscriber terminal, 320 Optical communication system, 330 OLT, 360 Optical fiber.

[Best Mode For Carrying Out The Invention]

Figure 1A:
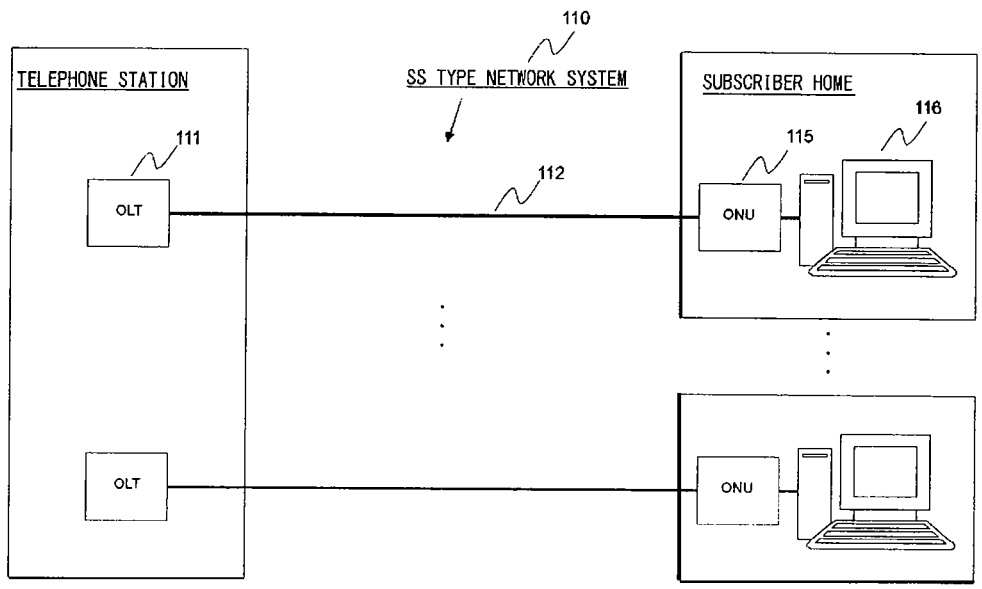
[FIG. 1(a)]
Figure 1B:
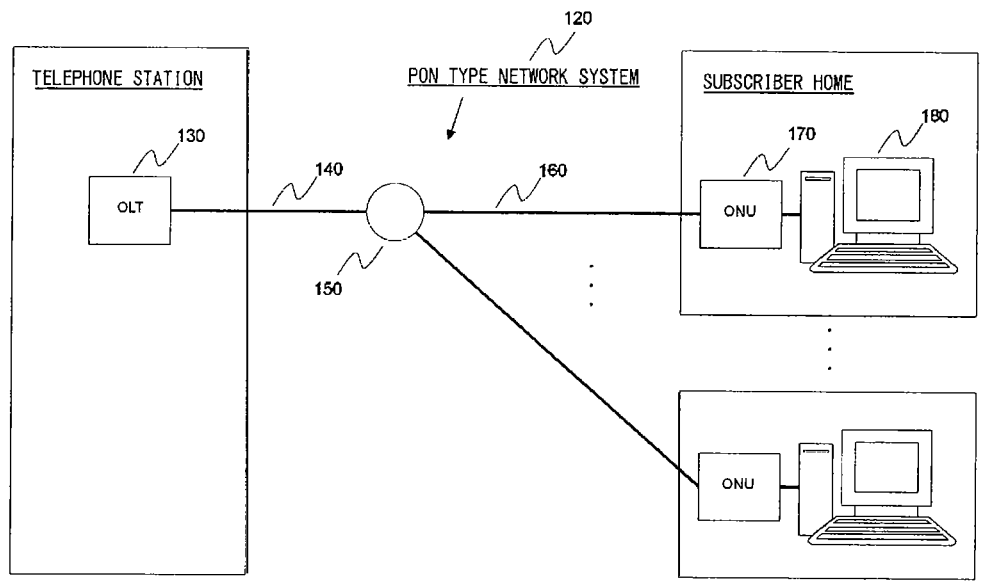
[FIG. 1(b)]
Figure 2:
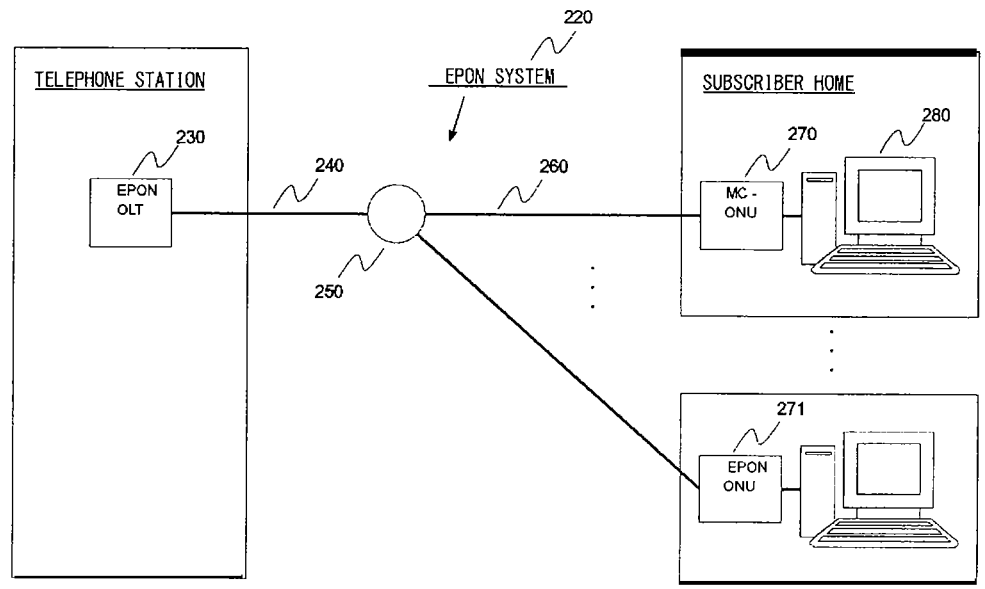
[FIG. 2]

An outline of an embodiment of the present invention will be presented below before a structure thereof is described. Even when an MC-ONU 270 is connected to an EPON system 220 as shown in FIG. 2, it is desirable that any adverse effects on the other transmission lines of the EPON system 220, for example, data transmission between the EPON-OLT 230 and the EPON-ONU 271, be avoided.

To realize that, what is required is a function of holding back the transmission of signals from the MC-ONU 270 until it is determined that the unit which is installed in a telephone station or the like and is about to establish a link with the MC-ONU 270 is a station-side apparatus of a media converter, or an MC-OLT, which is normally supposed to be a remote-end device to the MC-ONU 270 (hereinafter this function will be also referred to as "silent start function" as appropriate). Described hereinbelow is a proposed packaging technology for the silent start function of an MC-ONU in an optical communication system complying with the EFM transmission scheme established by the IEEE.

Figure 3:
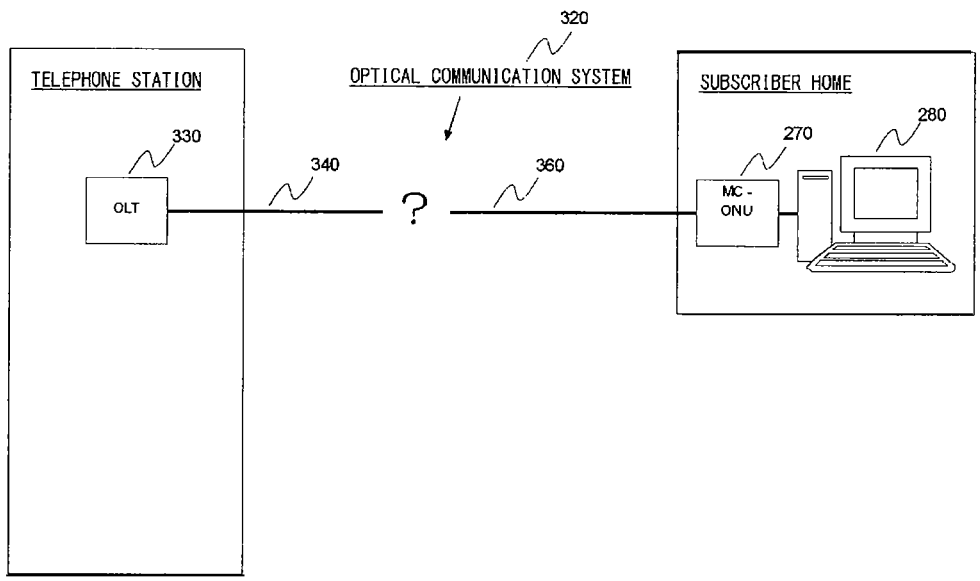
[FIG. 3]

FIG. 3 shows a configuration of an optical communication system 320 according to an embodiment of the present invention. An MC-ONU 270 in FIG. 3 is a media converter with the silent start function packaged therein, which is a communication apparatus installed at a subscriber home. The MC-ONU 270 is connected to an optical fiber 360 extending from a station-side OLT 330 with which the link is not yet established (also referred to as "unkown" as appropriate below). Here, the OLT 330 is a communication apparatus installed within a telephone station or the like. At this point of connection, it is not known to the MC-ONU 270 whether the remote-end device OLT 330 is a correct communicating-party unit MC-OLT or a communication apparatus not to be connected under normal circumstances, such as an EPON-OLT.

The MC-ONU 270 provided with the silent start function determines whether the unknown OLT 330 is an MC-OLT or not, and transmits signals if it determines that the OLT 330 is an MC-OLT or does not transmit the signals if it determines that the OLT 330 is not an MC-OLT.

FIG. 4 is a block diagram showing a functional configuration of the MC-ONU 270 shown in FIG. 3. The MC-ONU 270 includes a receiving unit 10, a determining unit 12, a transmission control unit 14, and transmitting unit 16. Note that generally known functions of an ONU, such as the wavelength-division multiplexing (WDM) function for add-drop processing, are known art and therefore the description thereof is omitted.

Each block shown in the block diagrams of the patent specification may be realized hardwarewise by elements, such as a CPU of a computer, or a mechanical apparatus and softwarewise by computer programs or the like. Depicted herein are functional blocks implemented by cooperation of hardware and software. Therefore, it will be obvious to those skilled in the art that the functional blocks may be implemented by a variety of manners including hardware only, software only or a combination of both and they are not limited to any of those.

The receiving unit 10 receives optical signals from the OLT 330 via the optical fiber 360. The receiving unit 10 converts the optical signals received into a bit string of electrical signals and sends the bit string to a subscriber terminal 280. The receiving unit 10, when it has received optical signals from an OLT with which the link has not yet been established, sends a bit string of electrical signals corresponding to the optical signals to the determining unit 12 also.

The determining unit 12 analyzes the bit string received by the receiving unit 10 and determines whether the OLT with which the link has not yet been established is an MC-OLT or not. The method of this determination will be described later. The determining unit 12, when it has determined that the transmitter of the bit string is an MC-OLT, communicates the decision to the transmission control unit 14.

When it has been determined by the determining unit 12 that the OLT with which the link has not yet been established is an MC-OLT, the transmission control unit 14 sends a specific data string to the transmitting unit 16, for instance, and thereby permits the transmitting unit 16 to transmit signals to the OLT.

The transmitting unit 16 receives a bit string of electrical signals from the subscriber terminal 280, converts it into optical signals, and transmits the optical signals to the OLT 330 via the optical fiber 360. In other words, the transmitting unit 16 transmits signals according to a P2P communication protocol.

In its initial settings, the transmitting unit 16 is set such that it does not transmit signals to the OLT with which the link has not yet been established. When the transmission of signals to the OLT with which the link has not yet been established is permitted by the transmission control unit 14, the transmitting unit 16 starts transmitting optical signals to the OLT 330, establishes a link to the OLT 330, and transmits data from the subscriber terminal 280 to the OLT 330.

Hereinbelow, after explaining preconditions for determination to be made by the determining unit 12, a plurality of determining methods will be described by citing examples. Note that the plurality of determining methods presented below may be combined as appropriate in order to raise the accuracy of determination.

<Preconditions of Determination>

When the unknown OLT 330 is an MC-OLT, and if the Auto-negotiation function of the MC-ONU 270 is set for Disable, an Idle signal will be received from the OLT 330 in order to establish a link with the MC-ONU 270. Or if the Auto-negotiation function of the MC-ONU 270 is set for Enable, then an auto-negotiation signal will be received. Note that the term "signal" here can refer to an optical signal, an electrical signal, or a bit string.

FIG. 5(a) shows identification information concerning the Idle signal. In the IEEE 802.3 standard, two codes of /I1/ and /I2/ are defined as codes of the Idle signal, which are associated with their specific octet values. FIG. 5(b) shows identification information concerning the Auto-negotiation signal. In the IEEE 802.3 standard, two codes of /C1/ and /C2/ are defined as codes of the Auto-negotiation signal, which are associated with their specific octet values.

When the unknown OLT 330 is an EPON-OLT, a Discovery GATE signal is received from the OLT 330 in order to establish a link with the MC-ONU 270. The format of the Discovery GATE signal conforms to the format of a MAC frame.

FIG. 6 shows a state of the MAC frame encapsulated for transmission. A MAC frame is received by the MC-ONU 270 in an encapsulated state as shown in FIG. 6. In FIG. 6, /I/ represents the same Idle signal as /I1/ and /I2/ mentioned above. Also, /S/ represents a Start_of_Packet signal, /D/ a Discovery GATE signal, /T/ an End of Packet signal, and /R/ a Carrier_Extend signal. In addition, there are cases where /V/ meaning an Error_Propagation signal, which is not shown, is received.

Thus, the determining unit 12 of the MC-ONU 270 determines whether the unknown OLT 330 is an MC-OLT or not based on whether a specific octet value is contained in a bit string based on the received signals from the unknown OLT 330 (hereinafter referred to as "determination target bit string" also). The determining methods will be described in detail below.

<Determining Method 1>

The determining unit 12 determines that the unknown OLT 330 is an MC-OLT when an octet value indicating /I/ only (hereinafter denoted simply by "/I/", the same applying to the other codes, too) is detected from a determination target bit string for a predetermined period of time.

The reason why this determining method is valid is as follows. As stated previously, the detection of a single /I/, namely a single Idle signal alone, does not warrant determining whether the unknown OLT 330 is an MC-OLT or other apparatus including an EPON-OLT. Nevertheless, an EPON-OLT normally transmits a Discovery GATE signal at intervals of a few seconds to an ONU with which the link has not yet been established. Hence, if the signals received during the few seconds are Idle signals alone, then the decision of the determining unit 12 that the unknown OLT 330 is an MC-OLT will be valid.

In this determining process, it is desirable that the period for analyzing the determination target bit string be set longer than the transmission interval of Discovery GATE signals by the EPON-OLT. More preferably, it should be set to a value a few seconds longer than the transmission interval of Discovery GATE signals. The preferable period is assumed to be 5 to 15 seconds, for instance. Note that an appropriate period may be set by weighing the circumstances for the subscriber terminal 280 which requires the establishment of a link in a short period of time and the MC-ONU which requires an accurate determination by securing a longer period of time.

<Determining Method 2>

The determining unit 12 determines that the unknown OLT 330 is an MC-OLT when it detects /C1/ or /C2/ from the determination target bit string. This is based on the determination that the Auto-negotiation signal from the unknown OLT 330 is contained.

<Determining Method 3>

The determining unit 12 determines that the unknown OLT 330 is not an MC-OLT when it detects at least one of /S/, /T/, /R/, and /V/ from the determination target bit string. In this case, the unknown OLT 330 is likely to be an EPON-OLT, but there are possibilities that it is an OLT of another scheme of transmitting MAC frames. A modification thereto may involve a combination of a plurality of above-mentioned codes, which may improve the accuracy of determination results.

<Determining Method 4>

The determining unit 12 determines that the unknown OLT 330 is not an MC-OLT when it detects a bit string of Discovery GATE signal of an EPON in the determination target bit string. In this case, the determination can be made specifically that it is an EPON-OLT.

FIG. 7(a) shows a constitution of a Discovery GATE signal of an EPON. As shown in FIG. 7(a), fixed values are defined for the Destination Address, Type, and Opcode fields, respectively. Hence, the determining unit 12 can decide that a bit string of Discovery GATE signal of an EPON is contained in the determination target bit string when it has detected a bit string of fixed values defined for these fields therein in the determination target bit string. Depending on the desired accuracy of determination result, the condition for the determination may be the detection of at least one field or the detection of a plurality of fields.

Also, the Number of grants/Flags field of a Discovery GATE signal may be a target of determination. FIG. 7(b) shows a constitution of a Number of grants/Flags field. The determining unit 12 can decide that a bit string of Discovery GATE signal of an EPON is contained in the determination target bit string when it has detected a fixed value "1" for the third bit of the Number of grants/Flags field.

<Determining Method 5>

The determining unit 12 determines that the unknown OLT 330 is not an MC-OLT when it detects a bit string of Pause frame of an EPON in the determination target bit string. The Pause frame is received from an unknown OLT 330 between the reception of a Discovery GATE signal and the reception of the next Discovery GATE signal. Therefore, in this case, too, it can be determined that the unknown OLT 330 is an EPON-OLT.

The Destination Address and Type in a Pause frame have the same octet values as those of a Discovery GATE signal, and the Opcode is defined to be "00-01". Accordingly, the determining unit 12 can decide that a bit string of Pause frame of an EPON is contained in the determination target bit string when it has detected a bit string of fixed values defined for these fields in the determination target bit string. It is to be noted that unlike the Discovery GATE signal, the Pause frame does not include the "Number of grants/Flags" field.

A description will be given below of an operation achieved by a structure as described above.

A user of a subscriber terminal 280 connects an MC-ONU 270 coupled to the subscriber terminal 280 to an optical fiber 360 without being conscious of whether the OLT 330 connected to the other end of the optical fiber 360 is a remote-end device in the P2P communication or not. As the receiving unit of the MC-ONU 270 receives a signal from the OLT 330 with which the link has not yet been established, the determining unit 12 analyzes the signal according to an above-described determining method and determines whether the OLT 330 is a remote-end device to the P2P communication, namely an MC-OLT, or not. Upon the decision that the OLT 330 is an MC-OLT, the transmission control unit 14 permits the transmitting unit 16 to send signals to the OLT 330, and the transmitting unit 16 transmits the signals to the OLT 330. From this point onward, a link establishing sequence is executed as appropriate at the OLT 330 and the MC-ONU 270, and upon the establishment of a link between the OLT 330 and the MC-ONU 270, transmission and reception of data from an upper layer such as an application begin.

With the MC-ONU 270 according to the present embodiment, it is possible to avoid its adverse effects on the other transmission lines even when it is mistakenly connected to a primarily incompatible system, such as an EPON system. Also, on the OLT side, it is not necessary to transmit its own frame which is not standard, such as a maintenance frame, and thus an optical communication system complying with the EFM transmission scheme established by the IEEE can be realized.

Up to this point, the present invention has been described in conjunction with the embodiments thereof. These embodiments are given solely by way of illustration. It will be understood by those skilled in the art that various modifications may be made to the combinations of the components and processes thereof, and all such modifications are also intended to fall within the scope of the present invention. Some examples of such modifications are described below.

As a link is established between the MC-OLT and the MC-ONU, the MC-OLT transmits an OAM (Operations, Administration and Maintenance) signal containing identification information indicating its being a media converter to the MC-ONU. When the receiving unit 10 of the MC-ONU 270 receives the OAM signal from the OLT 330, the determining unit 12 may determine whether the OAM signal contains identification information indicating its being an MC-OLT or not in order to reconfirm that the OLT with which it has established a link is really an MC-OLT. When the determining unit 12 has determined that the communication apparatus with which a link has been established is a device other than an MC-OLT, the transmission control unit 14 may send a specific data string, for instance, to the transmitting unit 16, thereby commanding it not to transmit signals to the OLT 330. According to this modification, even when, under certain circumstances, a link is once established by mistaking an OLT 330 which is not an MC-OLT for an MC-OLT, it is possible to suppress the transmission of signals to the OLT 330 in a short time. This will minimize any adverse effects on the other transmission lines.

Although the embodiments so far described concern an optical communication system, the technical concept underlying the present invention is not limited to such an optical communication system, but is applicable also to other types of communication means. For example, the present invention can be applied in providing a silent start function to a communication apparatus other than an ONU which is to be connected to an SS type network system.

Optional combinations of the aforementioned embodiments and modifications may also be useful as additional modes of the present invention. And it should be understood that new embodiments realized by such combinations and modifications thereof provide their own advantages. Thus, even when an ONU for point-to-point communication is mistakenly connected to an EPON system, its adverse effects on the other transmission lines in the EPON system can be avoided.

It should be understood by those skilled in the art that the functions to be performed by the constituent features cited in the claims can also be realized by the components shown in the embodiments and modifications thereof alone or in combination.

INDUSTRIAL APPLICABILITY

According to the present invention, even when an ONU for point-to-point communication is mistakenly connected to an EPON system, its adverse effects on the other transmission lines in the EPON system can be avoided.

The invention claimed is:

1. A subscriber-home communication apparatus installed at a subscriber home configured for a single-star type network, the communication apparatus comprising:
a receiving unit which receives a signal transmitted from a communication apparatus installed at a telecommunications carrier site which has not established a link;
a determining unit which determines that the communication apparatus which has not established a link is a remote-end device in the single-star type network on the condition that the signal received by the receiving unit for a predetermined period of time set longer than a transmission interval of Discovery GATE signals in an EPON is an idle signal; and
a transmitting unit which starts transmitting a signal to the communication apparatus, which has not established a link, from the subscriber home on the condition that it has been determined by the determining unit that the communication apparatus which has not established a link is the remote-end device in the single-star type network.

2. A subscriber-home communication apparatus according to claim 1, wherein the subscriber home communication apparatus is a media converter installed at the subscriber home, and wherein the determining unit determines that the communication apparatus which has not established a link is a media converter of the remote-end device in the single-star type network, on the condition that a signal which has been received by the receiving unit during the predetermined period of time is idle signal only.

3. A subscriber-home communication apparatus according to claim 1, wherein after the transmitting unit has started transmitting the signal, the receiving unit receives an operations/administration/maintenance (OAM) signal transmitted from a communication apparatus which has established a link, and
wherein to determine again whether the communication apparatus which has established a link is the remote-end device in a single-star type network or not, the determining unit determines whether information indicating that the communication apparatus which has established a link is the remote-end device in the single-star type network is contained in the OAM signal or not.

4. A subscriber-home communication apparatus according to claim 3, wherein when it has been determined by the determining unit that the communication apparatus which has established a link is an apparatus other than the remote-end device in the type network, the single-star type network, the transmitting unit suppresses the transmission of signals from the subscriber home to the communication apparatus which has established a link.

5. A subscriber-home communication apparatus installed at a subscriber home, the communication apparatus comprising:
- a receiving unit which receives a signal transmitted from a communication apparatus installed at a telecommunications carrier site which has not established a link;
- a determining unit which determines that the communication apparatus which has not established a link is a remote-end device in point-to-point communication on the condition that a bit string for auto-negotiation is contained in the signal received by the receiving unit; and
- a transmitting unit which starts transmitting a signal to the communication apparatus, which has not established a link, from the subscriber home on the condition that it has been determined by the determining unit that the communication apparatus which has not established a link is the remote-end device in point-to-point communication.

6. A subscriber-home communication apparatus according to claim 5, wherein after the transmitting unit has started transmitting the signal, the receiving unit receives an operations/administration/maintenance (OAM) signal transmitted from a communication apparatus which has established a link, and
- wherein to determine again whether the communication apparatus which has established a link is the remote-end device in point-to-point communication or not, the determining unit determines whether information indicating that the communication apparatus which has established a link is the remote-end device in point-to-point communication is contained in the OAM signal or not.

7. A subscriber-home communication apparatus according to claim 6, wherein when it has been determined by the determining unit that the communication apparatus which has established a link is an apparatus other than the remote-end device in point-to-point communication, the transmitting unit suppresses the transmission of signals from the subscriber home to the communication apparatus which has established a link.

8. A subscriber-home communication apparatus installed at a subscriber home, the communication apparatus comprising:
- a receiving unit which receives a signal transmitted from a communication apparatus installed at a telecommunications carrier site which has not established a link;
- a determining unit which determines that the communication apparatus which has not established a link is an apparatus other than a remote-end device in point-to-point communication on the condition that a bit string indicating any of start of packet, end of packet, carrier extend and error propagation is contained in the signal received by the receiving unit; and
- a transmitting unit which suppresses the transmission of signals from the subscriber home to the communication apparatus which has not established a link, when it has been determined by the determining unit that the communication apparatus which has not established a link is an apparatus other than the remote-end device in point-to-point communication.

9. A subscriber-home communication apparatus installed at a subscriber home, the communication apparatus comprising:
- a receiving unit which receives a signal transmitted from a communication apparatus installed at a telecommunications carrier site which has not established a link;
- a determining unit which determines that the communication apparatus which has not established a link is an apparatus other than a remote-end device in point-to-point communication on the condition that a discovery gate signal transmitted in an Ethernet passive optical network (EPON) is contained in the signal received by the receiving unit; and
- a transmitting unit which suppresses the transmission of signals from the subscriber home to the communication apparatus which has not established a link, when it has been determined by the determining unit that the communication apparatus which has not established a link is an apparatus other than the remote-end device in point-to-point communication.

10. A subscriber-home communication apparatus according to claim 9, wherein when a bit string, of predetermined fixed values defined as a partial field of the discovery gate signal, indicating at least one of destination address, type, opcode and number of grants/flags is detected from the received signal, the determining unit determines that the discovery gate signal is contained in the received signal.

11. A subscriber-home communication apparatus installed at a subscriber home, the communication apparatus comprising:
- a receiving unit which receives a signal transmitted from a communication apparatus installed at a telecommunications carrier site which has not established a link;
- a determining unit which determines that the communication apparatus which has not established a link is an apparatus other than a remote-end device in point-to-point communication on the condition that a bit string indicating a pause frame transmitted in an Ethernet passive optical network (EPON) is contained in the signal received by the receiving unit; and
- a transmitting unit which suppresses the transmission of signals from the subscriber home to the communication apparatus which has not established a link, when it has been determined by the determining unit that the communication apparatus which has not established a link is an apparatus other than the remote-end device in point-to-point communication.

12. A subscriber-home communication apparatus according to claim 11, wherein when a bit string, of predetermined fixed values defined as a partial field of the pause frame, indicating at least one of destination address, type and opcode is detected from the received signal, the determining unit determines that the pause frame is contained in the received signal.

* * * * *